(12) United States Patent
Shi et al.

(10) Patent No.: US 11,388,103 B2
(45) Date of Patent: Jul. 12, 2022

(54) MULTI-CHIP SYSTEM AND DATA TRANSMISSION METHOD THEREOF

(71) Applicant: Shanghai Zhaoxin Semiconductor Co., Ltd., Shanghai (CN)

(72) Inventors: Yang Shi, Shanghai (CN); Haozhao Yang, Shanghai (CN); Xuemin Zhang, Shanghai (CN)

(73) Assignee: Shanghai Zhaoxin Semiconductor Co., Ltd., Shanghai (CN)

( * ) Notice: Subject to any disclaimer, the term of this patent is extended or adjusted under 35 U.S.C. 154(b) by 23 days.

(21) Appl. No.: 16/939,090

(22) Filed: Jul. 27, 2020

(65) Prior Publication Data
US 2021/0385306 A1 Dec. 9, 2021

(30) Foreign Application Priority Data

Jun. 3, 2020 (CN) .......................... 202010493507.0

(51) Int. Cl.
*H04L 47/43* (2022.01)
*G06F 13/38* (2006.01)
(Continued)

(52) U.S. Cl.
CPC ............ *H04L 47/43* (2022.05); *G06F 13/387* (2013.01); *G06F 13/4009* (2013.01);
(Continued)

(58) Field of Classification Search
CPC ....... H04L 69/22; H04L 47/39; H04L 49/109; H04L 47/365; H04L 49/9057; H04L 47/43; H04L 67/565; H04L 69/14; G06F 13/387; G06F 13/1652; G06F 13/36; G06F 13/4009; G06F 15/163; H04W 28/06; H04W 28/10
See application file for complete search history.

(56) References Cited

U.S. PATENT DOCUMENTS 7,447,233 B2 * 11/2008 Narad ................. H04L 12/2854
370/252
8,396,064 B2 * 3/2013 Giesberts .............. H04L 69/323
370/392

(Continued)

OTHER PUBLICATIONS

El-Taha, M. et al. "Queueing Network Models of Credit-Based Flow Control." Computers and Mathematics with Applications 50. 2005. Elsevier Ltd. pp. 393-398. (Year: 2005).*

*Primary Examiner* — Thomas J. Cleary
(74) *Attorney, Agent, or Firm* — JCIPRNET

(57) ABSTRACT

A multi-chip system and a data transmission method thereof are provided. The multi-chip system includes a first chip, a link unit, and a second chip. The first chip includes multiple transmitter (TX) channels and a first data processing module. The TX channels are configured to provide at least one transaction information. The first data processing module converts the at least one transaction information into at least one first data packet according to a general packet format and packs the at least one first data packet according to a specific packet format to generate a second data packet. The first data processing module merges two sets of second data packets into a third data packet and transmits the third data packet to the link unit. The second chip receives the third data packet through the link unit.

30 Claims, 6 Drawing Sheets

(51) Int. Cl.
*H04L 47/10* (2022.01)
*H04L 49/109* (2022.01)
*G06F 15/163* (2006.01)
*G06F 13/40* (2006.01)
G06F 13/16 (2006.01)
G06F 13/36 (2006.01)
H04L 69/22 (2022.01)

(52) U.S. Cl.
CPC ............ *G06F 15/163* (2013.01); *H04L 47/39* (2013.01); *H04L 49/109* (2013.01); *G06F 13/1652* (2013.01); *G06F 13/36* (2013.01); *H04L 69/22* (2013.01)

(56) References Cited

U.S. PATENT DOCUMENTS

| | | | | |
|---|---|---|---|---|
| 8,554,148 | B2* | 10/2013 | Lee | H04L 7/041 |
| | | | | 455/63.1 |
| 8,880,696 | B1* | 11/2014 | Michels | G06F 13/287 |
| | | | | 709/225 |
| 2010/0128998 | A1* | 5/2010 | Wegener | G06T 9/00 |
| | | | | 382/248 |
| 2012/0117442 | A1* | 5/2012 | Lee | H04L 1/008 |
| | | | | 714/755 |
| 2013/0322467 | A1* | 12/2013 | Atef | H04L 49/9057 |
| | | | | 370/474 |
| 2014/0307732 | A1* | 10/2014 | Lida | H04L 1/206 |
| | | | | 370/389 |
| 2020/0259592 | A1* | 8/2020 | Wu | H04L 1/0083 |

\* cited by examiner

MULTI-CHIP SYSTEM AND DATA TRANSMISSION METHOD THEREOF

CROSS-REFERENCE TO RELATED APPLICATION

This application claims the priority benefit of China application no. 202010493507.0, filed on Jun. 3, 2020. The entirety of the above-mentioned patent application is hereby incorporated by reference herein and made a part of this specification.

BACKGROUND OF THE INVENTION

1. Field of the Invention

The invention relates to a data transmission architecture, and more particularly, to a multi-chip system and a data transmission method thereof.

2. Description of Related Art

For a general multi-chip system, the multi-chip system usually has a problem of poor data transmission efficiency among a plurality of chips. In this regard, the reason may be that a data length of transaction information transmitted among the plurality of chips is different, which results in that bandwidths of a link unit among the plurality of chips may not be efficiently utilized in the process of transmitting the transaction information by the link unit. Or, because time for each chip to process the transaction information is not fixed, when a receiver (RX) of a certain chip has not released space to receive new transaction information, if the RX of the chip continues to receive the new transaction information, data jamming occurs in the chip. In view of this, solutions of several embodiments will be provided below to improve the data transmission efficiency of the multi-chip system.

SUMMARY OF THE INVENTION

The invention is directed to a multi-chip system and a data transmission method thereof, which may have a highly efficient data transmission effect among a plurality of chips.

According to an embodiment of the invention, the multi-chip system of the invention includes a first chip, a link unit, and a second chip. The first chip includes a plurality of transmitter (TX) channels and a first data processing module. The plurality of TX channels are configured to provide at least one transaction information. The first data processing module is coupled to the plurality of TX channels to receive the at least one transaction information. The first data processing module is configured to convert the at least one transaction information into at least one first data packet according to a general packet format, and pack the at least one first data packet according to a specific packing format to generate a second data packet. The link unit is coupled to the first chip. The first data processing module merges two sets of second data packets into a third data packet, and transmits the third data packet to the link unit. The second chip is coupled to the link unit. The second chip is configured to receive the third data packet through the link unit. The specific packing format includes a plurality of data words (DWs) and a plurality of data head flags and a plurality of data tail flags corresponding to the plurality of DWs.

According to an embodiment of the invention, the data transmission method of the multi-chip system of the invention includes the following steps. A first chip converts at least one transaction information into at least one first data packet according to a general packet format. The first chip packs the at least one first data packet according to a specific packing format to generate a second data packet. The specific packing format includes a plurality of DWs and a plurality of data head flags and a plurality of data tail flags corresponding to the plurality of DWs. The first chip merges two sets of second data packets into a third data packet, and transmits the third data packet to a link unit. The second chip receives the third data packet from the link unit.

Based on the foregoing, according to the multi-chip system and the data transmission method of the invention, the first chip and the second chip may transmit data packets with a specific format to each other via the link unit, so as to effectively improve the bandwidth utilization efficiency of the link unit, and thereby improving the efficiency of data transmission between the first chip and the second chip.

To make the features and advantages of the invention clear and easy to understand, the following gives a detailed description of embodiments with reference to accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
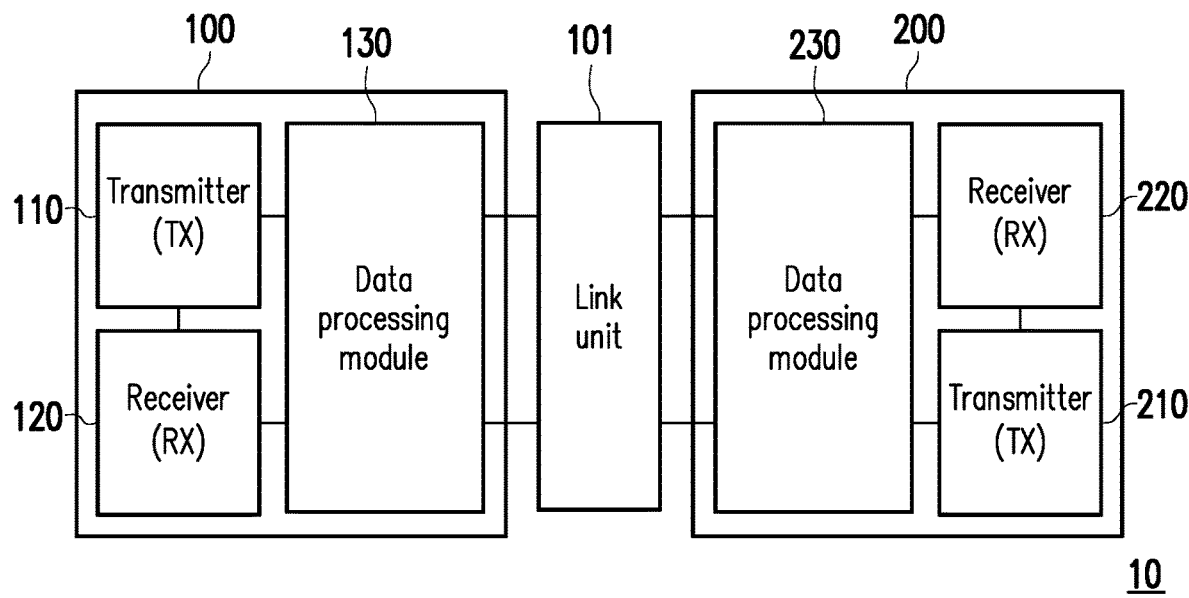
FIG. 1 is a schematic diagram of a multi-chip system according to an embodiment of the invention.

Exemplary embodiments of the present invention are described in detail, and examples of the exemplary embodiments are shown in the accompanying drawings. Whenever possible, the same component symbols are used in the drawings and descriptions to indicate the same or similar parts.

FIG. 1 is a schematic diagram of a multi-chip system according to an embodiment of the invention. Referring to FIG. 1, a multi-chip system 10 includes a first chip 100, a second chip 200, and a link unit 101. The first chip 100 includes a TX 110, an RX 120, and a data processing module 130. The second chip 200 includes a TX 210, an RX 220, and a data processing module 230. The first chip 100 is coupled to the link unit 101, and the link unit 101 is coupled to the second chip 200. The first chip 100 and the second chip 200 are in duplex communication. Therefore, the data processing module 130 of the first chip 100 and the data processing module 230 of the second chip 200 may transmit data packets to each other via the link unit 101. The link unit 101 may be, for example, a peripheral component interconnect express (PCIe) bus. In the present embodiment, the data processing module 130 and the data processing module 230 have a specially designed VPIPL architecture respectively, and the data processing module 130 and the data processing module 230 adopt a specific data packet transmission form to improve the bandwidth utilization efficiency of the link unit.

For example, the TX 110 of the first chip 100 may output transaction information to the data processing module 130. The data processing module 130 may convert the transaction information into a first data packet according to a general packet format, and pack the first data packet according to a specific packing format to generate a second data packet. After the data processing module 130 generates two sets of second data packets, the data processing module 130 merges the two sets of second data packets into a third data packet, and transmits the third data packet to the link unit 101. In contrast, the data processing module 230 of the second chip 200 may receive the third data packet transmitted by the link unit 101. The data processing module 230 may unpack the third data packet to obtain the two sets of second data packets conforming to the specific packing format, and unpack the two sets of second data packets to generate the first data packet conforming to the general packet format. Then, the data processing module 230 may convert the first data packet into the transaction information, and provide the transaction information to the RX 220, so that the second chip 200 may further provide the transaction information to a back-end processing circuit.

Figure 2:
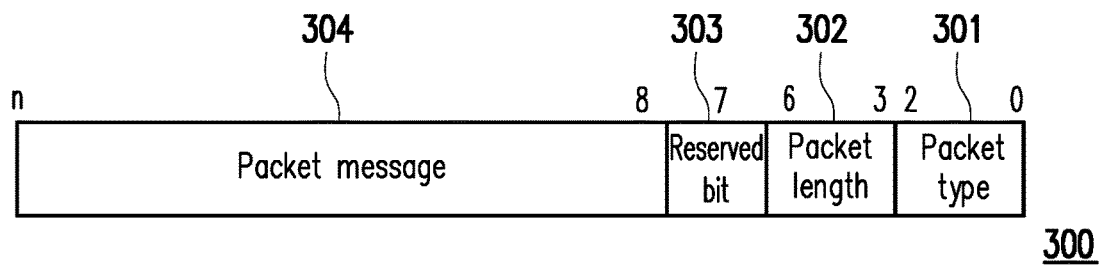
FIG. 2 is a schematic diagram of a data packet having a general packet format according to an embodiment of the invention.

FIG. 2 is a schematic diagram of a data packet having a general packet format according to an embodiment of the invention. Referring to FIG. 2, a data packet 300 having a general packet format in the present embodiment may include a data content corresponding to a packet type 301, a packet length 302, a reserved bit 303, and a packet message 304. In the present embodiment, the packet type 301 may fixedly occupy a 3-bit data length of the data packet 300, the packet length 302 may fixedly occupy a 4-bit data length of the data packet 300, and the reserved bit 303 may fixedly occupy a 1-bit data length of the data packet 300. A data length of the packet message 304 is determined according to different types of transaction information. In other words, when the data processing module 130 or the data processing module 230 of FIG. 1 converts the transaction information into a data packet having a general packet format, the data packets having the general packet format corresponding to different types of transaction information may have different packet lengths (total data length).

Figure 3:
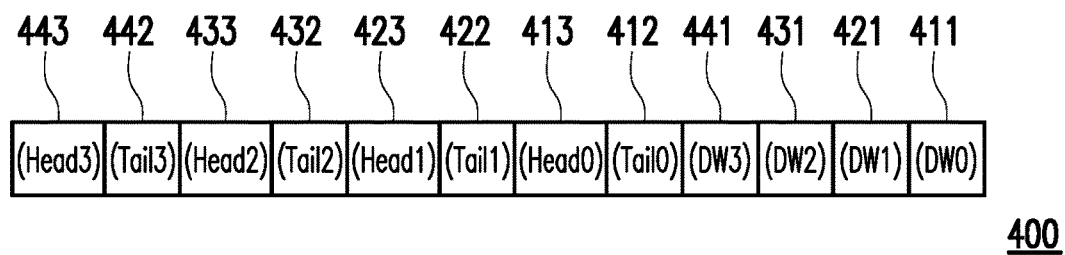
FIG. 3 is a schematic diagram of a data packet having a specific packet format according to an embodiment of the invention.

FIG. 3 is a schematic diagram of a data packet having a specific packet format according to an embodiment of the invention. Referring to FIG. 3, a data packet 400 having a specific packet formate present embodiment may include four DWs 411, 421, 431, and 441, and corresponding four data tail flags 412, 422, 432, and 442 and four data head flags 413, 423, 433, and 443. In the present embodiment, a data length of each of the plurality of DWs is 32 bits, and a data length of each of the plurality of data head flags and the plurality of data tail flags is 1 bit. In other words, the data packet 400 has a fixed data length ((32 bits)x4+(8 bits)=136 bits).

To further explain with FIGS. 1 to 3, in the present embodiment, the type of transaction information provided to the data processing module 130 and the data processing module 230 by the TX 110 of the first chip 100 and the TX 210 of the second chip 200 in FIG. 1 may include C2P request information, C2M request information, lock request information, snoop request information, snoop response and eviction information, response information, read data information, and message information. In addition, credit information is further transmitted between the first chip 100 and the second chip 200 in FIG. 1. Details of the credit information will be described in the following embodiments. In this regard, respective maximum data lengths (bits) of transaction information of various transaction information types and credit information and variable lengths (DWs) of data packets converted into a specific packet format may be as shown in Table 1 below respectively.

TABLE 1

| Transaction information | Variable length (DW) | Maximum data length (bit) |
|---|---|---|
| C2P request information | 4/6/20 | 640 |
| C2M request information | 13/20 | 640 |
| Lock request information | 4/6/13/20 | 192 |
| Snoop request information | 4 | 128 |
| Snoop response and eviction information | 2/3/18/19 | 608 |
| Response information | 2 | 64 |
| Read data information | 3/9/17 | 544 |
| Message information | 3 | 96 |
| Credit information | 2 | 64 |

A packet format conversion mode of the data packet in the present embodiment is described below by way of example. Assuming that transaction information provided by the TX 110 of the first chip 100 to the data processing module 130 is lock request information in Table 1 and the lock request information has a data length of 192 bits, the data processing module 130 firstly converts the transaction information into a data packet having a general packet format as shown in FIG. 2. Then, the data processing module 130 further converts the data packet having the general packet format into a data packet having a specific packet format as shown in FIG. 3, and the data processing module 130 generates two data packets having the specific packet format. To this end, four DWs of the first data packet having the specific packet format are filled with a 128-bit data content (32x4=128) of the lock request information, and the first two DWs of the second data packet having the specific packet format are filled with the remaining 64-bit data content (192−128=64) of the lock request information. A first data head label of the first data packet having the specific packet format is 1, it indicates that the first DW of the first data packet having the specific packet format is an information beginning. Other data head labels and data tail labels of the first data packet having the specific packet format are 0. Moreover, a second data tail label of the second data packet having the specific packet format is 1, it indicates that the second DW of the second data packet having the specific packet format is an information ending. Other data head labels and data tail labels of the second data packet having the specific packet format are 0.

However, since the second data packet having the specific packet format still has space for two DWs, the data processing module 130 sequentially merges data of next transaction information (for example, response information with 64 bits) into a third DW and a fourth DW of the second data packet having the specific packet format. A third data head label of the second data packet having the specific packet format is marked as 1, and a fourth data tail label of the second data packet having the specific packet format is marked as 1. In addition, the data processing module 130 finally merges the two fully-filled data packets two having the specific packet format and outputs the data packets to the data processing module 230 of the second chip 200 via the link unit 101. However, if there is more next transaction information and only part of the data is merged into the third DW and the fourth DW of the second data packet having the specific packet format, the fourth data tail label of the second data packet having the specific packet format is marked as 0, and the data of another part of the next transaction information is merged into a next data packet having the specific packet format. The data head label is configured to indicate whether data of the DW in the data packet is a data beginning of the transaction information, and the data tail label is configured to indicate whether data of the DW in the data packet is a data ending of the transaction information. In other words, the bandwidths of the link unit 101 will be efficiently utilized, so that a highly efficient data transmission effect can be realized between the first chip 100 and the second chip 200.

Figure 4:
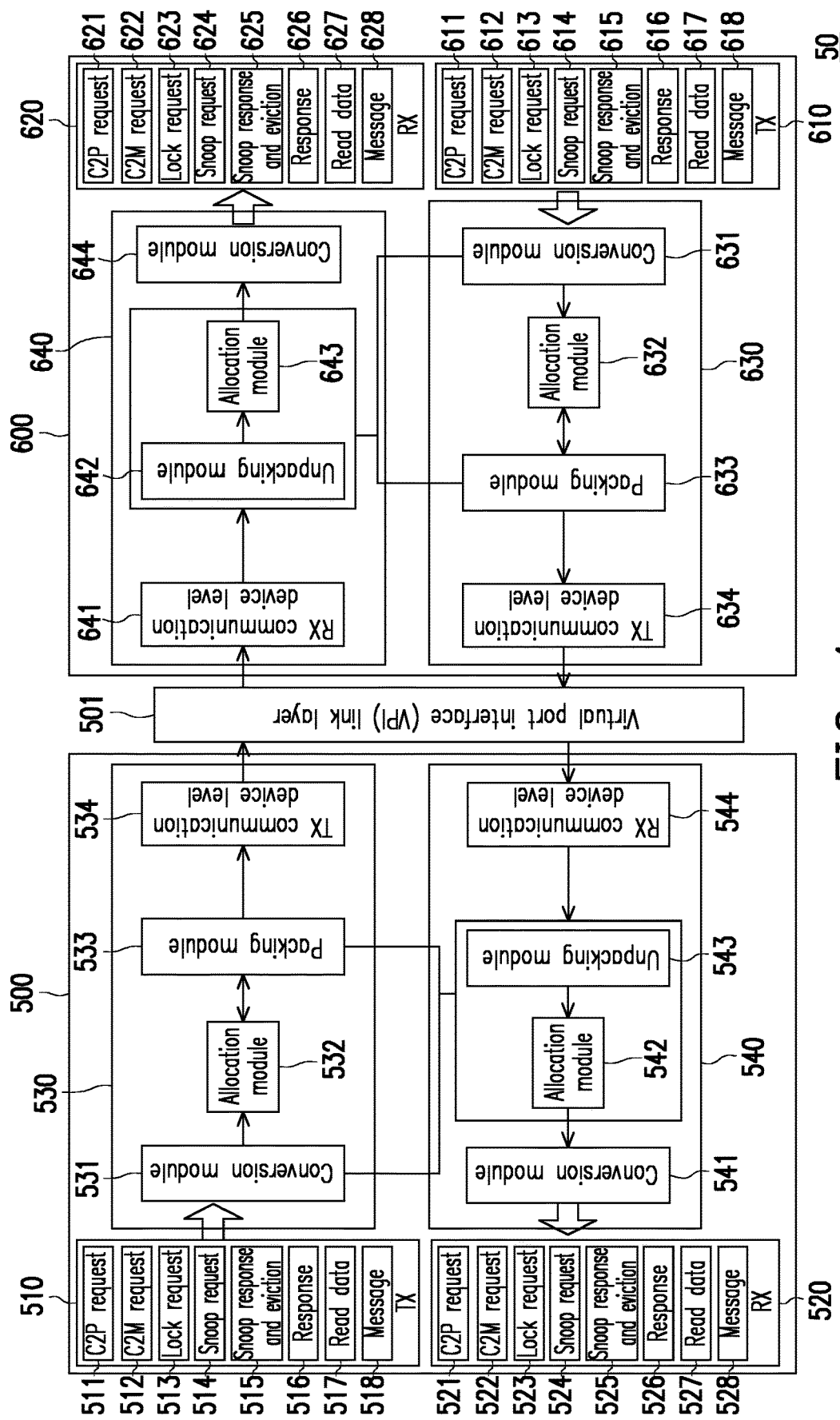
FIG. 4 is an architecture diagram of a virtual port interface (VPI) of a multi-chip system according to an embodiment of the invention.

FIG. 4 is an architecture diagram of a virtual port interface (VPI) of a multi-chip system according to an embodiment of the invention. Referring to FIG. 4, a VPI architecture of a multi-chip system 50 may be divided into a VPIPL of a first chip 500, a VPIPL of a second chip 600, and a VPI link layer 501 (that is, link unit) between the first chip 500 and the second chip 600. In the present embodiment, the first chip 500 includes a TX 510, an RX 520, and data processing modules 530 and 540. The second chip 600 includes a TX 610, an RX 620, and data processing modules 630 and 640. A VPIPL architecture of the first chip 500 is implemented by the data processing modules 530 and 540. A VPIPL architecture of the second chip 600 is implemented by the data processing modules 630 and 640. Moreover, a plurality of TX channels 511-518 and 611-618 of the TXs 510 and 610 and a plurality of RX channels 521-528 and 621-628 of the RXs 520 and 620 may correspond to different transaction information types respectively, such as a C2P request, a C2M request, a lock request, a snoop request, snoop response and eviction, a response, read data, and a message.

In the present embodiment, the data processing module 530 may include a conversion module 531, an allocation module 532, a packing module 533, and a TX clock domain crossing (TX CDC) 534. The conversion module 531 is coupled to the plurality of TX channels 511-518. The TX CDC 534 is coupled to the VPI link layer 501. Specifically, when the plurality of TX channels 511-518 provide one or more transaction information to the conversion module 531, the conversion module 531 determines, according to whether a credit provided to the first chip 500 by the second chip 600 is sufficient (for example, whether a credit value is non-zero), whether to convert the one or more transaction information into one or more first data packets having a general packet format. The conversion module 531 is coupled to the allocation module 532. Then, the conversion module 531 transmits the one or more first data packets having the general packet format to the allocation module 532 to allocate the one or more first data packets to a corresponding plurality of channels according to different transaction information types. The plurality of channels may be, for example, a plurality of first in first out (FIFO) buffers. The allocation module 532 is coupled to the packing module 533. Then, the packing module 533 determines, according to whether the credit provided to the first chip 500 by the second chip 600 is sufficient, whether to pack the one or more first data packets and credit information (if there is credit information) according to a specific packet format, so as to sequentially output one or more second data packets having the specific packet format.

It is worth noting that the aforementioned credit represents a current transaction information receiving capability of the second chip 600. If the credit is insufficient (for example, the credit value is zero), the conversion module 531 and the packing module 533 stop operating. On the contrary, if the credit is sufficient (for example, the credit value is non-zero), the conversion module 531 and the packing module 533 convert a data packet format. Moreover, the aforementioned credit information refers to another credit provided to the second chip 600 by the first chip 500 according to a current transaction information receiving capability of the first chip 500. The packing module 533 is coupled to the TX CDC 534. Finally, the TX CDC 534 merges every two different but sequential second data packets into one or more third data packets, and sequentially outputs the one or more third data packets to the VPI link layer 501. In other words, based on the aforementioned credit mechanism, the first chip 500 of the present embodiment only sends data packets when the second chip 600 has space to receive transaction information. Therefore, the first chip 500 of the present embodiment may effectively reduce data jamming during data transmission. Similarly, the data processing module 630 of the second chip 600 includes a conversion module 631, an allocation module 632, a packing module 633, and a TX CDC 634, and has a data transmission mechanism similar to that of the aforementioned data processing module 530. Therefore, descriptions will be omitted.

In the present embodiment, the data processing module 640 may include an RX clock domain crossing (RX CDC) 641, an unpacking module 642, an allocation module 643, and a conversion module 644. The conversion module 644 is coupled to the plurality of RX channels 621-628. The RX CDC 641 is coupled to the VPI link layer 501 and the unpacking module 642. Specifically, when the RX CDC 641 receives the one or more third data packets from the VPI link layer 501, the RX CDC 641 sequentially separates the one or more third data packets into at least two sets of second data packets to provide the second data packets to the unpacking module 642 one by one. Then, the unpacking module 642 receives the second data packets, and unpacks the second data packets to obtain the one or more first data packets. The unpacking module 642 is coupled to the allocation module 643. Then, the conversion module 633 transmits the one or more first data packets having the general packet format and the credit information (if there is the credit information) to the allocation module 643 to allocate the one or more first data packets to a corresponding plurality of other channels according to different transaction information types. The plurality of other channels may be, for example, a plurality of other FIFO buffers. The allocation module 643 is coupled to the conversion module 644. Then, the conversion module 644 converts the one or more first data packets into the one or more transaction information, and provides the one or more transaction information to at least one of the plurality of RX channels 621-628 having the corresponding transaction information type.

It is worth noting that if the allocation module 643 obtains the credit information provided by the first chip 500, the second chip 600 updates another credit provided to the second chip 600 by the first chip 500 according to the credit information, so that the data processing module 630 of the second chip 600 may convert the data packet format and transmit to the data processing module 540 of the first chip 500. In other words, based on the aforementioned credit mechanism, the second chip 600 of the present embodiment only allows the first chip 500 to provide a data packet when there is space to receive transaction information, and thereby effectively reducing data jamming. Similarly, the data processing module 540 of the first chip 500 includes an RX CDC 541, an unpacking module 542, an allocation module 543, and a conversion module 544, and has a data transmission mechanism similar to that of the aforementioned data processing module 640. Therefore, descriptions will be omitted. In addition, in regard to a credit allocation mechanism between the first chip 500 and the second chip 600, not only the credit information may be respectively sent to each other by the data processing modules 530 and 630 in the aforementioned specific packet format, but also, the credit information may be respectively sent to each other independently by means of an additional signal transmission path.

Figure 5:
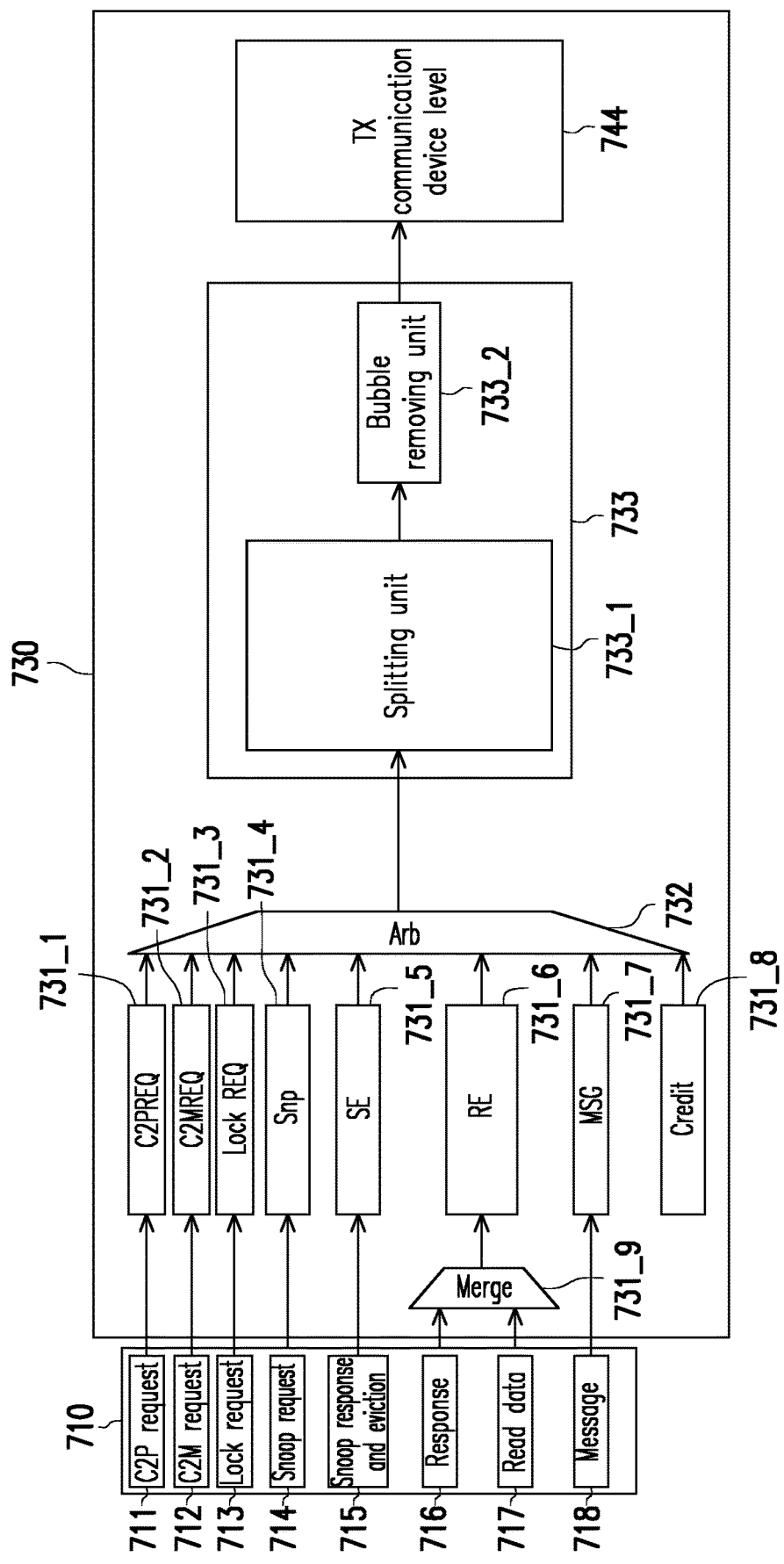
FIG. 5 is an architecture diagram of a TX virtual port interface protocol layer (VPIPL) according to an embodiment of the invention.

FIG. 5 is an architecture diagram of a TX VPIPL according to an embodiment of the invention. Referring to FIG. 5, a data processing module 730 in FIG. 5 is a specific implementation architecture of the data processing modules 530 and 630 in FIG. 4. Referring to FIG. 5, a plurality of TX channels 711-718 of a TX 710 may correspond to different transaction information types respectively, such as a C2P request, a C2M request, a lock request, a snoop request, snoop response and eviction, a response, read data, and a message. The data processing module 730 includes a plurality of channels 731_1-731_8, a merging unit 731_9, an arbitration unit 732, a packing unit 733, and a TX CDC 744. The plurality of channels 731_1-731_8 may be, for example, a plurality of FIFO buffers. The packing unit 733 includes a first splitting unit 733_1 and a bubble removing unit 733_2. In the present embodiment, the plurality of channels 731_1-731_8 receive at least one of at least one first data packet converted via at least one transaction information and credit information from the plurality of TX channels 711-718 according to respective corresponding transaction information types. The channel 731_8 is configured to receive credit information additionally provided. The merging unit 731_9 is coupled to the TX channels 716 and 717 and the channel 731_6. The merging unit 731_9 receives and merges a plurality of first data packets corresponding to a response and read data, and provides the response and the read data to one of the plurality of first channels.

In the present embodiment, the arbitration unit 732 is coupled to the plurality of channels 731_1-731_8, and determines whether to poll the plurality of channels 731_1-731_8 according to a credit provided by an RX chip to output at least one of the at least one first data packet and the credit information. The packing unit 733 is coupled to the arbitration unit 732. The packing unit 733 receives and splits at least one of the at least one first data packet and the credit information into a second data packet. In the present embodiment, the splitting unit 733_1 is coupled to the arbitration unit 732 to receive and split at least one of the at least one first data packet and the credit information to generate the second data packet. The bubble removing unit 733_2 is coupled to the splitting unit 733_1, and is configured to remove bubbles in the second data packet. The TX CDC 744 is coupled to the packing unit 733 to receive the second data packet, and the TX CDC 744 is configured to merge, after the TX CDC 744 receives two sets of second data packets, the two sets of second data packets into a third data packet, and output the third data packet to the link unit. In addition, after the data processing module 730 transmits the third data packet to the link unit, the data processing module 730 correspondingly adjusts the credit provided by the RX chip according to an amount of transaction information and credit information that are sent out.

Figure 6:
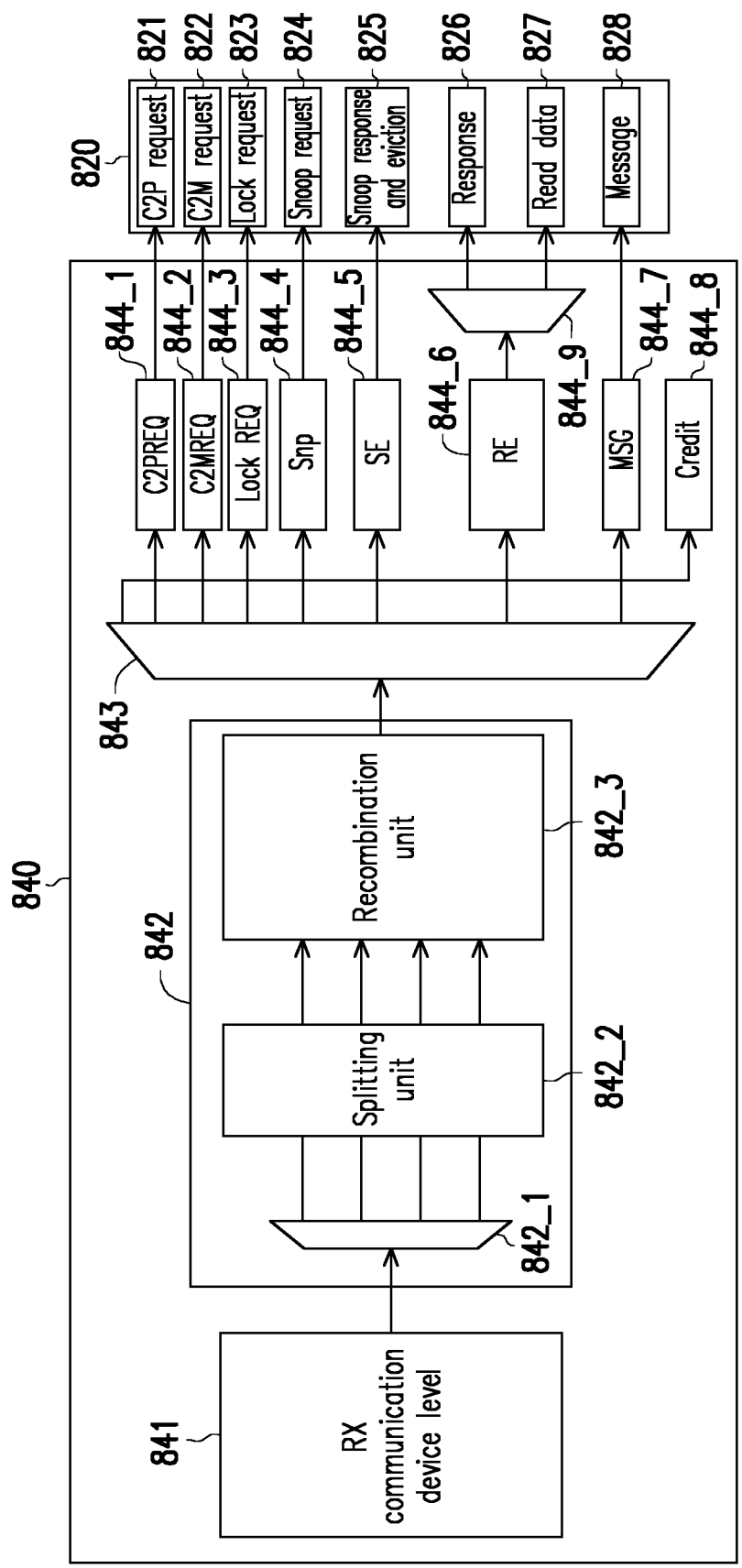
FIG. 6 is an architecture diagram of an RX VPIPL according to an embodiment of the invention.

FIG. 6 is an architecture diagram of an RX VPIPL according to an embodiment of the invention. Referring to FIG. 6, a data processing module 840 in FIG. 6 is a specific implementation architecture of the data processing modules 540 and 640 in FIG. 4. Referring to FIG. 6, a plurality of RX channels 821-828 of an RX 810 may correspond to different transaction information types respectively, such as a C2P request, a C2M request, a lock request, a snoop request, snoop response and eviction, a response, read data, and a message. The data processing module 840 includes an RX CDC 841, an unpacking unit 842, an allocation unit 843, and a plurality of channels 844_1-844_8. The plurality of channels 844_1-844_8 may be, for example, a plurality of FIFO buffers. The unpacking unit 842 includes a multi-task unit 842_1, a splitting unit 842_2, and a recombination unit 842_3. In the present embodiment, the RX CDC 841 receives the third data packet as described in the embodiment of FIG. 5 from the link unit, and separates the third data packet into the two sets of second data packets. The unpacking unit 842 is coupled to the RX CDC 841. The unpacking unit 842 receives the two sets of second data packets, and unpacks the two sets of second data packets to obtain the at least one first data packet. In the present embodiment, the multi-task unit 842_1 is coupled to the RX CDC 841, and is configured to transmit one or more second data packets to the splitting unit 842_2. The splitting unit 842_2 is coupled to the multi-task unit 842_1. The splitting unit 842_2 splits each second data packet into four DWs, and provides the four DWs to the recombination unit 842_3. The recombination unit 842_3 is coupled to the splitting unit 842_2, and is configured to recombine the four DWs according to the plurality of data head flags and the plurality of data tail flags in the second data packets to generate the at least one first data packet.

In the present embodiment, the allocation unit 843 is coupled to the unpacking unit 842 to receive the at least one first data packet. The plurality of channels 844_1-844_8 are coupled to the allocation unit 843. The allocation unit 843 allocates the at least one first data packet to at least one of the plurality of channels 844_1-844_8 according to a transaction information type corresponding to the at least one first data packet. A separation unit 844_9 is coupled to the channel 844_6 and the RX channels 826 and 827. The separation unit 844_9 is configured to receive and separate the at least one first data packet corresponding to the response and the read data. The channels 844_1-844_7 and the separation unit 844_9 are configured to provide transaction information of corresponding transaction information types converted via the at least one first data packet to the RX channels 821-828, respectively. Moreover, the data processing module 840 adjusts a credit provided to a TX chip according to an amount of transaction information having been provided to a back-end processing circuit by the RX channels 821-828.

Figure 7:
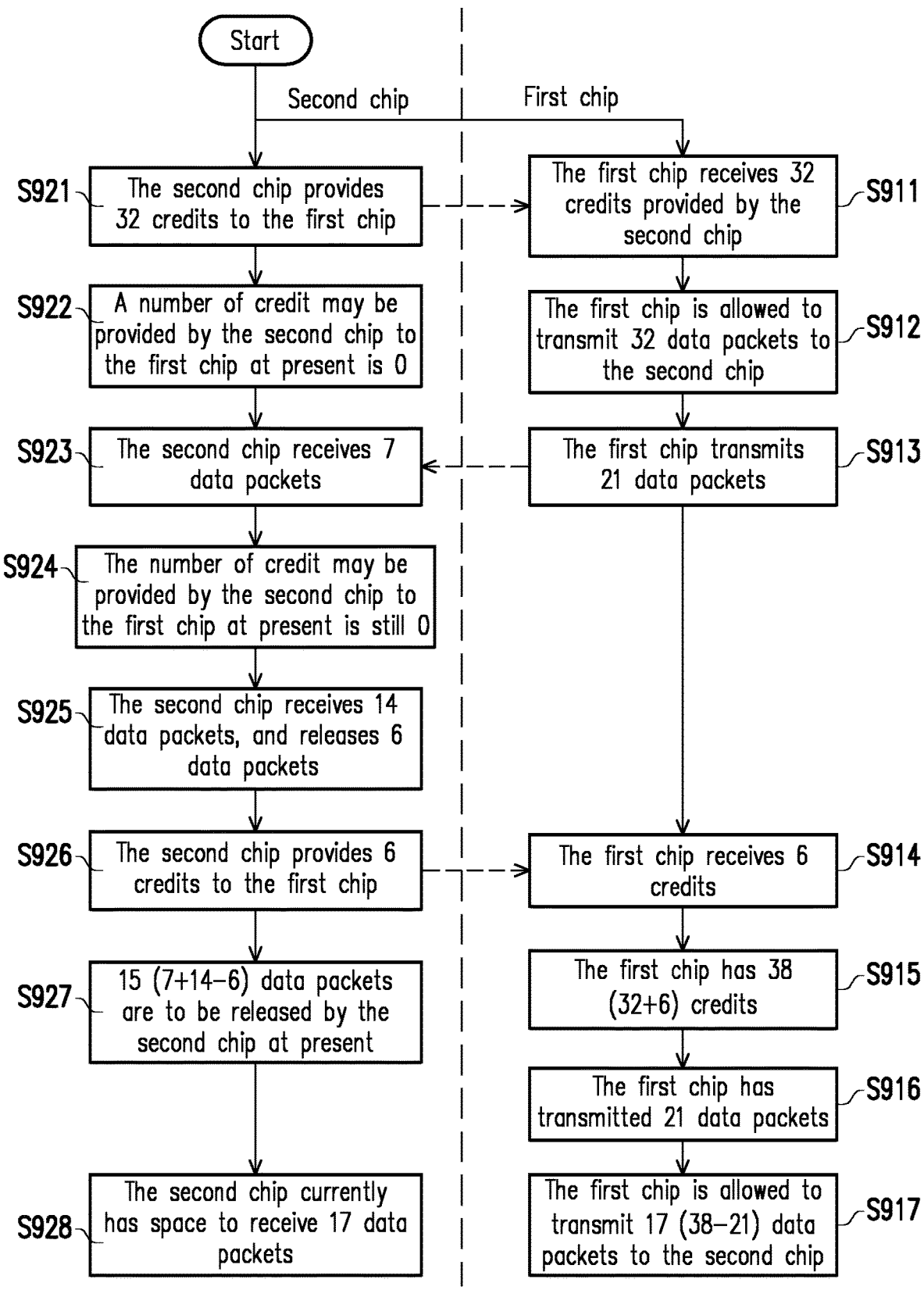
FIG. 7 is a schematic diagram of a credit allocation mechanism according to an embodiment of the invention.

FIG. 7 is a schematic diagram of a credit allocation mechanism according to an embodiment of the invention. Referring to FIGS. 1 and 7, a plurality of stages of FIG. 7 are used to illustrate a credit allocation mechanism between two chips of the invention, and the first chip 100 and the second chip 200 in FIG. 1 are taken as examples. Starting from stage S921, the second chip 200 provides 32 credits to the first chip 100. For the first chip 100, at stage S911, the first chip 100 receives 32 credits provided by the second chip 200. The first chip 100 may, for example, record a credit value of 32. At stage S912, the first chip 100 is allowed to transmit 32 data packets to the second chip 200. At stage S913, the first chip 100 transmits 21 data packets. It is assumed that the first chip 100 has output 14 data packets, but the 14 data packets are still being transmitted on a data transmission path and have not been received by the second chip 200. For the second chip 200, at stage S922, the quantity of credits that the second chip 200 can provide to the first chip 100 at present is 0. At stage S923, the second chip 200 receives 7 data packets. At stage S924, since the second chip 200 does not currently release any data packets, the quantity of credits that the second chip 200 can provide to the first chip 100 at present is still 0. Until stage S925, the second chip 200 receives the subsequent 14 data packets, and has released 6 data packets. Therefore, at stage S926, the second chip 200 provides 6 credits to the first chip 100. Next, for the first chip 100, at stage S914, the first chip 100 receives 6 credits. Therefore, at stage S915, the first chip 100 has 38 (32+6) credits. The first chip 100 may, for example, change the recorded credit value to 38. At stage S916, the first chip 100 obtains through calculation that 21 data packets have been transmitted. Therefore, at stage S917, the first chip 100 is allowed to transmit 17 (38−21) data packets to the second chip 200. The first chip 100 may, for example, change the recorded credit value to 17. For the second chip 200, at stage S927, 15 (7+14−6) data packets are to be released by the second chip 200 at present. At stage S928, the second chip 200 currently has space to receive 17 data packets. Accordingly, according to the aforementioned credit allocation mechanism, the first chip 100 may determine whether to transmit data packets to the second chip 200 according to a real-time data packet receiving capability (space) of the second chip 200. Therefore, data jamming in the second chip 200 may be effectively reduced. Similarly, the first chip 100 may also provide a credit to the second chip 200, so that the second chip 200 transmits a data packet to the first chip 100 according to the credit provided by the first chip 100. In addition, the data packet described in the present embodiment may, for example, refer to the first data packet described in each of the aforementioned embodiments.

Figure 8:
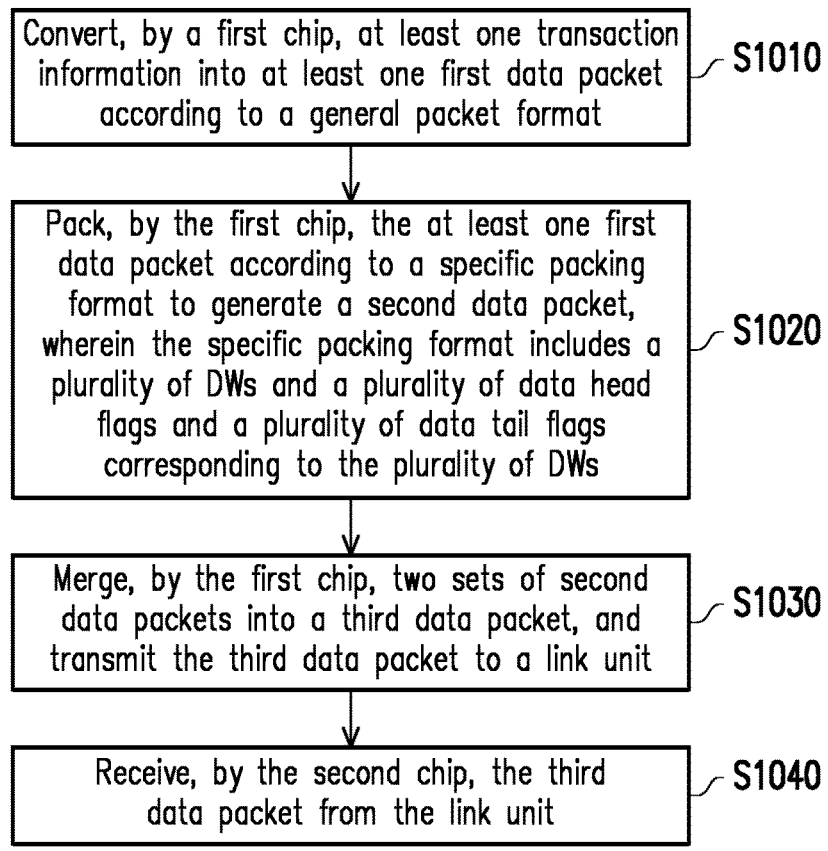
FIG. 8 is a flowchart of a TX data transmission method according to an embodiment of the invention.

FIG. 8 is a flowchart of a TX data transmission method according to an embodiment of the invention. Referring to FIGS. 1 and 8, steps S1010 to S1040 of the present embodiment may be applied to the multi-chip system 10 in FIG. 1. In step S1010, the first chip 100 converts at least one transaction information into at least one first data packet according to a general packet format. In step S1020, the first chip 100 packs the at least one first data packet according to a specific packing format to generate a second data packet. The specific packing format includes a plurality of DWs and a plurality of data head flags and a plurality of data tail flags corresponding to the plurality of DWs. In step S1030, the first chip 100 merges two sets of second data packets into a third data packet, and transmits the third data packet to the link unit 101. In step S1040, the second chip 200 receives the third data packet from the link unit 101. Therefore, the first chip 100 may fixedly transmit data packets having a specific format to the second chip 200 via the link unit 101, so as to effectively improve the bandwidth utilization efficiency of the link unit 101, and thereby improving the efficiency of data transmission between the first chip 100 and the second chip 200. In addition, for the detailed architecture, specific data transmission mode, and technical details of the multi-chip system 10 of the present embodiment, reference may be made to the contents of the embodiments of FIGS. 1 to 7 for sufficient teaching, suggestions, and implementation instructions. Descriptions will be omitted herein.

Figure 9:
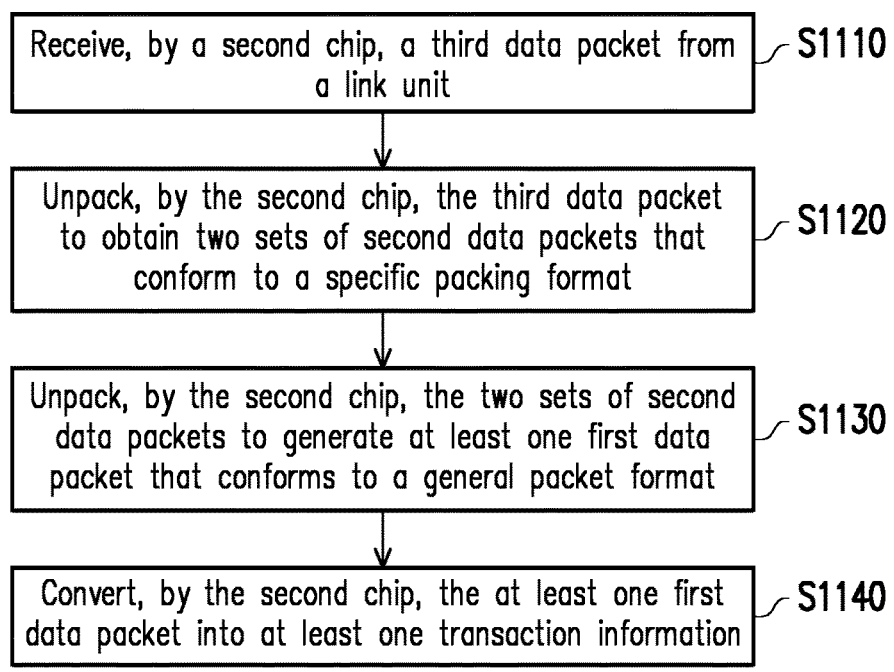
FIG. 9 is a flowchart of an RX data transmission method according to an embodiment of the invention.

FIG. 9 is a flowchart of an RX data transmission method according to an embodiment of the invention. Referring to FIGS. 1 and 9, steps S1110 to S1140 of the present embodiment may be applied to the multi-chip system 10 in FIG. 1. In step S1110, the second chip 200 receives a third data packet from the link unit 101. In step S1120, the second chip 200 unpacks the third data packet to obtain two sets of second data packets that conform to the specific packing format. In step S1130, the second chip 200 unpacks the two sets of second data packets to generate at least one first data packet that conforms to the general packet format. In step S1140, the second chip 200 converts the at least one first data packet into at least one transaction information. Therefore, the second chip 200 may fixedly receive data packets having a specific format to the first chip 100 via the link unit 101, so as to effectively improve the bandwidth utilization efficiency of the link unit 101, and thereby improving the efficiency of data transmission between the first chip 100 and the second chip 200. In addition, for the detailed architecture, specific data receiving mode, and technical details of the multi-chip system 10 of the present embodiment, reference may be made to the contents of the embodiments of FIGS. 1 to 8 for sufficient teaching, suggestions, and implementation instructions. Descriptions will be omitted herein.

Based on the foregoing, according to the multi-chip system and the data transmission method thereof provided by the invention, a packet format may be converted for transaction information to be transmitted to each other according to a specific packing format by designing a data processing module with a special VPIPL architecture in a first chip and a second chip respectively, so that the first chip and the second chip may transmit data packets having a specific format to each other via a link unit to effectively improve the bandwidth utilization efficiency of the link unit. Moreover, according to the multi-chip system and the data transmission method thereof provided by the invention, the quantity of data packets transmitted in real time may be effectively controlled in a manner of a credit allocation mechanism to effectively reduce data jamming in a chip, and thereby effectively improving the data transmission efficiency of the multi-chip system.

Finally, it should be noted that the foregoing embodiments are merely used for describing the technical solutions of the invention, but are not intended to limit the invention. Although the invention is described in detail with reference to the foregoing embodiments, a person of ordinary skill in the art should understand that, modifications may still be made to the technical solutions in the foregoing embodiments, or equivalent replacements may be made to some or all of the technical features; and such modifications or replacements do not cause the essence of corresponding technical solutions to depart from the scope of the technical solutions in the embodiments of the invention.

What is claimed is:
1. A multi-chip system, comprising:
a first chip, comprising:
a plurality of transmitter (TX) channels, configured to provide at least one transaction information; and
a first data processing circuit, coupled to the plurality of TX channels to receive the at least one transaction information, wherein the first data processing circuit is configured to convert the at least one transaction information into at least one first data packet according to a general packet format, and pack the at least one first data packet according to a specific packing format to generate a second data packet, wherein the second data packet has a fixed data length, and in response to that the second data packet still has free space after filling current transaction information into the second data packet, the first data processing circuit merges next transaction information into the free space of the second data packet;

a link circuit, coupled to the first chip, wherein the first data processing circuit merges two sets of second data packets into a third data packet and transmits the third data packet to the link circuit; and a second chip, coupled to the link circuit; and configured to receive the third data packet through the link circuit, wherein the specific packing format comprises a plurality of data words (DWs), a plurality of data head flags corresponding to the plurality of DWs, and a plurality of data tail flags corresponding to the plurality of DWs.

2. The multi-chip system according to claim 1, wherein the first chip determines whether the first data processing circuit packs the at least one first data packet according to a credit provided by the second chip to generate the second data packet, and the first chip adjusts the credit according to a quantity of the first data packet transmitted to the link circuit.

3. The multi-chip system according to claim 2, wherein the first data processing circuit comprises:
a plurality of first channels, configured to receive at least one of the at least one first data packet and credit information according to respective corresponding transaction information types;
an arbitration circuit configured to determine whether to poll the plurality of first channels according to the credit provided by the second chip to output at least one of the at least one first data packet and the credit information, wherein the plurality of first channels is coupled between the plurality of TX channels and the arbitration circuit;
a packing circuit, coupled to the arbitration circuit and configured to receive and split at least one of the at least one first data packet and the credit information into the second data packet; and
a TX clock domain crossing (TX CDC), coupled to the packing unit to receive the second data packet and configured to merge the two sets of second data packets into the third data packet after the TX CDC receives the two sets of second data packets and output the third data packet to the link circuit.

4. The multi-chip system according to claim 3, wherein the packing circuit comprises:
a first splitting circuit, coupled to the arbitration circuit and configured to receive and split at least one of the at least one first data packet and the credit information to generate the second data packet; and
a bubble removing circuit, coupled to the first splitting circuit and configured to remove bubbles in the second data packet.

5. The multi-chip system according to claim 3, wherein the first data processing circuit further comprises:
a merging circuit, coupled to one of the plurality of first channels and configured to receive and merge a plurality of first data packets corresponding to a response and read data to be provided to one of the plurality of first channels.

6. The multi-chip system according to claim 3, wherein the first chip determines the credit information according to a current transaction information receiving capability, wherein the credit information is configured to provide another credit to the second chip.

7. The multi-chip system according to claim 2, wherein the second chip comprises:
a plurality of receiver (RX) channels; and
a second data processing circuit, coupled to the link circuit and the plurality of RX channels, wherein
the second data processing circuit receives the third data packet through the link circuit and is configured to unpack the third data packet to obtain the two sets of second data packets conforming to the specific packing format, and unpack the two sets of second data packets to generate the at least one first data packet conforming to the general packet format, wherein
the second data processing circuit converts the at least one first data packet into the at least one transaction information and provides the at least one transaction information to at least one of the plurality of RX channels having a corresponding transaction information type.

8. The multi-chip system according to claim 7, wherein the second data processing circuit comprises:
an RX clock domain crossing (RX CDC), configured to receive the third data packet from the link circuit and separate the third data packet into the two sets of second data packets;
an unpacking circuit, coupled to the RX CDC and configured to receive the two sets of second data packets and unpack the two sets of second data packets to obtain the at least one first data packet;
an allocation circuit, coupled to the unpacking circuit and configured to receive the at least one first data packet; and
a plurality of second channels, coupled between the allocation circuit and the plurality of RX channels, wherein the allocation circuit allocates the at least one first data packet to at least one of the plurality of second channels according to a transaction information type corresponding to the at least one first data packet.

9. The multi-chip system according to claim 8, wherein the unpacking circuit comprises:
a second splitting circuit, coupled to the RX CDC and configured to split the second data packets; and
a recombination circuit, coupled to the second splitting circuit and configured to recombine the split second data packets according to the plurality of data head flags and the plurality of data tail flags in the second data packets to generate the at least one first data packet.

10. The multi-chip system according to claim 8, wherein the first data processing circuit further comprises:
a separation circuit, coupled to one of the plurality of second channels and configured to receive and separate the at least one first data packet corresponding to a response and read data.

11. The multi-chip system according to claim 8, wherein after the second chip releases the at least one first data packet, the second chip updates the credit provided to the first chip according to a packet quantity of the at least one first data packet released.

12. The multi-chip system according to claim 1, wherein the general packet format comprises a packet type, a packet length, a reserved bit, and a packet message.

13. The multi-chip system according to claim 1, wherein the specific packing format comprises four data words (DWs), four data head flags, and four data tail flags.

14. The multi-chip system according to claim 1, wherein a data length of each of the plurality of data words (DWs) is 32 bits, and a data length of each of the plurality of data head flags and the plurality of data tail flags is 1 bit.

15. The multi-chip system according to claim 1, wherein the at least one transaction information comprises at least one of C2P request information, C2M request information, lock request information, snoop request information, snoop response and eviction information, response information, read data information, and message information.

16. A data transmission method of a multi-chip system, wherein the multi-chip system comprises a first chip, a link circuit, and a second chip, the data transmission method comprising:
    converting, by the first chip, at least one transaction information into at least one first data packet according to a general packet format;
    packing, by the first chip, the at least one first data packet according to a specific packing format to generate a second data packet, wherein the specific packing format comprises a plurality of data words (DWs), a plurality of data head flags corresponding to the plurality of DWs, and a plurality of data tail flags corresponding to the plurality of DWs, wherein the second data packet has a fixed data length, and in response to that the second data packet still has free space after filling current transaction information into the second data packet, the first data processing circuit merges next transaction information into the free space of the second data packet;
    merging, by the first chip, two sets of second data packets into a third data packet and transmitting the third data packet to the link circuit; and
    receiving, by the second chip, the third data packet from the link circuit.

17. The data transmission method according to claim 16, wherein the step of packing, by the first chip, the at least one first data packet according to the specific packing format to generate the second data packet comprises:
    determining, by the first chip, whether to pack the at least one first data packet according to a credit provided by the second chip to generate the second data packet; and
    adjusting, by the first chip, the credit according to a quantity of first data packets transmitted to the link circuit.

18. The data transmission method according to claim 17, further comprising:
    unpacking, by the second chip, the third data packet to obtain the two sets of second data packets conforming to the specific packing format;
    unpacking, by the second chip, the two sets of second data packets to generate the at least one first data packet conforming to the general packet format; and
    converting, by the second chip, the at least one first data packet into the at least one transaction information.

19. The data transmission method according to claim 18, wherein the step of unpacking, by the second chip, the two sets of second data packets to generate the at least one first data packet conforming to the general packet format comprises:
    receiving, by an unpacking circuit, the two sets of second data packets and unpacking the two sets of second data packets to obtain the at least one first data packet;
    receiving, by an allocation circuit, the at least one first data packet; and
    allocating, by the allocation circuit, the at least one first data packet to at least one of a plurality of second channels according to a transaction information type corresponding to the at least one first data packet.

20. The data transmission method according to claim 19, wherein the step of receiving, by the unpacking circuit, the two sets of second data packets and unpacking the two sets of second data packets to obtain the at least one first data packet comprises:
    splitting, by a second splitting circuit, the second data packets; and
    recombining, by a recombination circuit, the split second data packets according to the plurality of data head flags and the plurality of data tail flags in the second data packets to generate the at least one first data packet.

21. The data transmission method according to claim 19, further comprising:
    receiving and separating, by a separation circuit, the at least one first data packet corresponding to a response and read data.

22. The data transmission method according to claim 19, further comprising:
    updating, by the second chip, the credit provided to the first chip according to a packet quantity of the at least one first data packet released after the second chip releases the at least one first data packet.

23. The data transmission method according to claim 16, wherein the step of packing, by the first chip, the at least one first data packet according to the specific packing format to generate the second data packet comprises:
    receiving, by a plurality of first channels, the at least one first data packet and credit information according to respective corresponding transaction information types;
    determining, by an arbitration circuit, whether to poll the plurality of first channels according to a credit provided by the second chip to output at least one of the at least one first data packet and the credit information; and
    receiving and splitting, by a packing circuit, at least one of the at least one first data packet and the credit information into the second data packet.

24. The data transmission method according to claim 23, wherein the step of receiving and splitting, by the packing circuit, at least one of the at least one first data packet and the credit information into the second data packet comprises:
    receiving and splitting, by a first splitting circuit, at least one of the at least one first data packet and the credit information to generate the second data packet; and
    removing, by a bubble removing circuit, bubbles in the second data packet.

25. The data transmission method according to claim 23, further comprising:
    receiving and merging, by a merging circuit, a plurality of first data packets corresponding to a response and read data and providing the response and the read data to one of the plurality of first channels.

26. The data transmission method according to claim 23, wherein the first chip determines the credit information according to a current transaction information receiving capability, wherein the credit information is configured to provide another credit to the second chip.

27. The data transmission method according to claim 16, wherein the general packet format comprises a packet type, a packet length, a reserved bit, and a packet message.

28. The data transmission method according to claim 16, wherein the specific packing format comprises four data words (DWs), four data head flags, and four data tail flags.

29. The data transmission method according to claim 16, wherein a data length of each of the plurality of data words (DWs) is 32 bits and a data length of each of the plurality of data head flags and the plurality of data tail flags is 1 bit.

30. The data transmission method according to claim 16, wherein the at least one transaction information comprises at least one of C2P request information, C2M request information, lock request information, snoop request information, snoop response and eviction information, response information, read data information, and message information.

* * * * *